S. BUCHSBAUM.
BELT BUCKLE.
APPLICATION FILED JUNE 24, 1920.

1,399,745.

Patented Dec. 13, 1921.

Inventor
Samuel Buchsbaum
by Jabel & Mueller
Attys

UNITED STATES PATENT OFFICE.

SAMUEL BUCHSBAUM, OF CHICAGO, ILLINOIS.

BELT-BUCKLE.

1,399,745.  Specification of Letters Patent.  Patented Dec. 13, 1921.

Application filed June 24, 1920. Serial No. 391,465.

*To all whom it may concern:*

Be it known that I, SAMUEL BUCHSBAUM, a citizen of the United States, residing at Chicago, in the county of Cook and State of Illinois, have invented a certain new and useful Improvement in Belt-Buckles, of which the following is a full, clear, concise, and exact description, reference being had to the accompanying drawings, forming a part of this specification.

This invention relates to belt buckles and has for its object the provision of an improved belt buckle structure whereby the the belt is held in any position without the use of holes in the belt.

The invention further relates to belt buckles having a clamping mechanism for holding the free end of the belt at any desired point, which clamping mechanism will grip the belt without being completely closed, thus allowing the free end of the belt to be displaced from its position adjacent the other belt portion a considerable distance before releasing the grip of the clamping means on the free extremity of the belt.

The invention, moreover, relates to a belt buckle with the gripping means for both ends of the belt mounted on a common pivot pin, said gripping means comprising a plate carrying a holding member for one end of the belt and an eccentrically mounted clamping member for the free extremity of the belt.

Further objects and advantages of the invention will appear as the description of the accompanying drawing proceeds in which—

Figure 1:
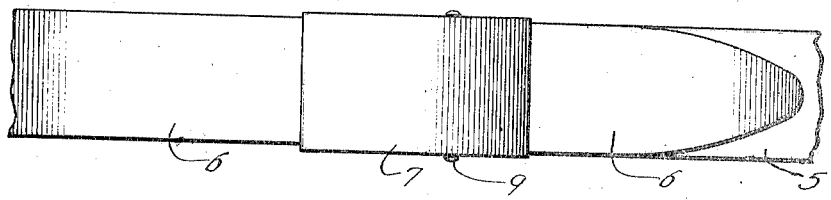
Figure 1 is a front face view of the belt buckle showing a portion of the belt associated therewith.
Figure 2:
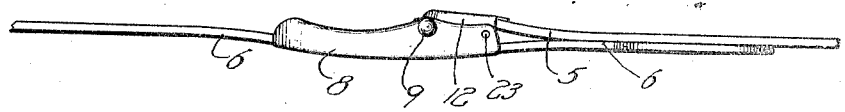
Fig. 2 is an edge view of the same.
Figure 3:
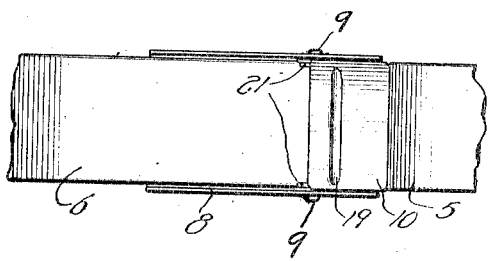
Fig. 3 is a rear face view of the belt buckle showing a portion of the belt associated therewith.

Referring in detail to the drawings, the belt 5 having the free end 6 is provided with a belt buckle having a front plate 7 provided with rearwardly extending flanges 8 between which is mounted the pivot pin 9. Mounted on the pivot pin 9 is a plate 10 upon which is pivotally mounted the gripping member 11, the pivotal connections being formed by laterally extending projections on the member 11 that extend into openings in the flanges 12 on the plate 10 at 13.

The rear portion 14 of the gripping member engages with an inwardly struck rib 15 on the plate 10 which acts as a stop for said plate. The opposite end of the gripping member 11 is provided with teeth 16 to grip the belt 5 at one end thereof. Mounted on the pivot pin 9 is a clamping member 17 which is provided with ears at the side portions thereof provided with openings to receive the pivot pin 9 which openings are nearer the outer edge portions of the ears than they are to the teeth 18 formed thereon for gripping the belt portion 6. This produces an eccentric mounting for the clamping member 17. The clamping member 17 is provided with rearwardly extending lugs 19 on the pivot ears thereof which are adapted to engage with the plate 10 when the same is swung in a clock wise direction from the dotted position in Fig. 4 to the full line position therein to bring the clamping member 17 into engagement with the free extremity of the belt 6 as the belt 5 carries the clamping member 18 along with it.

Figure 4:
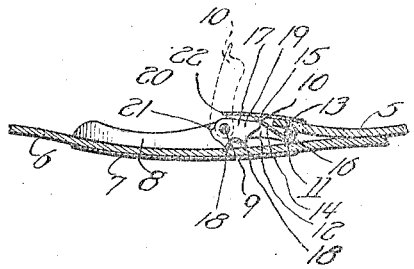
Fig. 4 is a longitudinal sectional view of the belt buckle and portions of the belt associated therewith.

It will be noted that the rearwardly extending portion of the plate 10 forming the ear 20 at the end thereof for receiving the pivot-pin 9 is smaller than the clamping member 17 thus causing the clamping member to come into engagement with the free end of the belt 6 before the plate 10 is swung to its final position as shown in Fig. 4 thus locking the free extremity of the belt 6 in its clamping position and at the same time allowing a certain freedom of the movement of the belt 10 toward and away from the front plate 7 on the pivot pin 9 without releasing the free extremity of the belt.

The clamping member 17 is provided with a projecting offset portion 21 on each of the pivot ears thereof which are adapted to engage the rear edge portion 22 of the plate 10 when the same is swung to the dotted position shown in Fig. 4, thus carrying the clamping member 17 along with the plate 10 as it is moved in a counter-clockwise direction to disengage the said clamping member from the free extremity of the belt 6 and allowing the same to be removed from the buckle or adjusted therein.

In order to lock the plate 10 and clamping member 17 in the closed position shown in Fig. 4 the flanges 8 are provided with openings 23 that are adapted to receive the ends of the pivot pins 13 mounted in the flanges 12, the flanges 8 being sufficiently resilient to allow the flanges 12 to enter between the flanges 8 and the pivot pin to spring into position in the opening 23.

It will be seen that the buckle embodied in this invention comprises a clamping member for the free extremity of the belt mounted on a common pivot pin with the pivoted plate holding the other end of the belt and that this plate operates the clamping member both in its closing and opening movement but that the clamping member for the free extremity of the belt is closed prior to the completion of the movement of the member 10 toward the front plate 7 and that it is not released from its gripping action on the free extremity of the belt until after the plate 10 has been swung a considerable distance away from the front plate 7 thus firmly gripping the belt and providing against any accidental disengagement between the clamping member and the free extremity of the belt.

Having thus described my invention I desire to have it understood that I do not intend to limit myself to the exact details shown and described except as defined by the following claims:

1. In a device of the character described, a belt buckle comprising a front plate and a pair of clamping elements for the ends of said belt, said clamping elements being mounted for independent swinging movement about a common pivot pin in said front plate, and one of said clamping elements being eccentrically mounted therein.

2. In a device of the character described, a belt buckle comprising a front plate and a pair of clamping elements for the ends of said belt pivotally mounted therein, said separate clamping elements having a common pivot pin, and one of said separate clamping elements being mounted on said pin so as to grip said belt between the same and said front plate before the clamping movement thereof is completed.

3. In a device of the character described, a belt buckle comprising a front plate, side walls projecting rearwardly therefrom, a plate provided with gripping means for one end of a belt and a clamping element for the other end of said belt pivotally mounted between said side walls, and a common pivot pin upon which said plate and clamping element are adapted to have an independent swinging movement, said clamping element being eccentrically mounted on said pivot pin.

4. In a device of the character described, a belt buckle comprising a front plate, side walls projecting rearwardly therefrom, a plate provided with gripping means for one end of a belt and a clamping element for the other end of said belt pivotally mounted between said side walls, and a common pivot pin upon which said plate and clamping element are adapted to have an independent swinging movement, said clamping element being mounted on said pin so as to grip said belt between the same and said front plate before the clamping movement thereof is completed.

5. In a device of the character described, a belt buckle comprising a front plate, side walls projecting rearwardly therefrom, a plate provided with gripping means for one end of a belt and a clamping element for the other end of said belt pivotally mounted between said side walls, and a common pivot pin for said plate and clamping element, said clamping element being eccentrically mounted on said pivot pin, and having lugs thereon projecting toward said pivoted plate, whereby when said last mentioned plate is swung on its pivot toward said clamping element said lugs engage said plate to swing said clamping element into clamping relation to said belt.

6. In a device of the character described, a belt buckle comprising a front plate, side walls projecting rearwardly therefrom, a plate provided with gripping means for one end of a belt and a clamping element for the other end of said belt pivotally mounted between said side walls, and a common pivot pin for said plate and clamping element, said clamping element being eccentrically mounted on said pivot pin, and having a portion thereon coöperating with said pivoted plate, whereby when said plate is swung on its pivot toward said clamping element said clamping element is swung into clamping relation with said belt.

7. In a device of the character described, a belt buckle comprising a front plate, side walls projecting rearwardly therefrom, a plate provided with gripping means for one end of a belt and a clamping element for the other end of said belt pivotally mounted between said side walls, and a common pivot pin for said plate and clamping element, said clamping element being eccentrically mounted on said pivot pin, and having lugs thereon projecting toward said pivoted plate, whereby when said last mentioned plate is swung on its pivot toward said clamping element said lugs engage said plate to swing said clamping element into clamping relation to said belt, said front plate and said pivoted plate having coöperating locking members thereon to lock said clamping element in clamping position.

8. In a device of the character described, a belt buckle comprising a front plate, side walls projecting rearwardly therefrom, a plate provided with gripping means for one end of a belt and a clamping element for the other end of said belt pivotally mounted between said side walls, and a common pivot pin for said plate and clamping element, said clamping element being eccentrically mounted on said pivot pin, and having rearwardly extending lugs thereon, whereby when said pivoted plate is swung on its pivot away from said clamping element said lugs engage the rear edge of said plate to swing said clamping element to belt releasing position.

9. In a device of the character described, a belt buckle comprising a front plate, side walls projecting rearwardly therefrom, a plate provided with gripping means for one end of a belt and a clamping element for the other end of said belt pivotally mounted between said side walls, and a common pivot pin for said plate and clamping element, said clamping element being eccentrically mounted on said pivot pin, and having rearwardly extending lugs thereon, whereby when said pivoted plate is swung on its pivot away from said clamping element said lugs engage the rear edge of said plate to swing said clamping element to belt releasing position, said pivoted plate being adapted to swing through a portion of its movement before said lugs and plate come into engagement.

10. In a device of the character described, a belt buckle comprising a front plate and a pair of clamping elements for the ends of the belt pivotally mounted therein, said clamping elements having a common pivot pin, and one of said clamping elements being eccentrically mounted therein, the other of said clamping elements being provided with means to move said eccentrically mounted clamping element toward clamping position.

11. In a device of the character described, a belt buckle comprising a front plate and a pair of clamping elements for the ends of the belt pivotally mounted therein, said clamping elements having a common pivot pin, and one of said clamping elements being eccentrically mounted therein, the other of said clamping elements being provided with means to move said eccentrically mounted clamping element to clamping position, said eccentric clamping element being so mounted that said other clamping element has a limited freedom of movement toward and away from said front plate without affecting the clamping action of said eccentrically mounted element.

12. In a device of the character described, a belt buckle comprising a front plate and a pair of clamping elements for the ends of the belt pivotally mounted therein, one of said clamping elements being eccentrically mounted therein, the other of said clamping elements being provided with means engaging said eccentrically mounted clamping element to move said last mentioned element to clamping position, said eccentric clamping element being so mounted that said other clamping element has a limited freedom of movement toward and away from said front plate without affecting the clamping action of said eccentrically mounted element.

13. In a device of the character described, a belt buckle comprising a front plate and a pair of clamping elements for the ends of said belt pivotally mounted therein, said clamping elements having a common pivot pin, and one of said clamping elements being mounted on said pin so as to grip said belt between the same and said front plate before the clamping movement thereof is completed, and before the other of said clamping elements engages said front plate, said other clamping element being adapted to move said first clamping element toward and away from clamping position.

14. In a device of the character described, a belt buckle comprising a front plate and a pair of clamping elements for the ends of said belt pivotally mounted therein, said clamping elements having a common pivot pin, and one of said clamping elements being mounted on said pin so as to grip said belt between the same and said front plate before the clamping movement thereof is completed, and before the other of said clamping elements engages said front plate, said other clamping element being adapted to move said first clamping element into and out of clamping position, said other clamping element having a limited play relative to said first clamping element.

15. In a device of the character described, a belt buckle comprising a front plate, side walls projecting rearwardly therefrom, a plate provided with gripping means for one end of a belt and a clamping element for the other end of said belt pivotally mounted between said side walls, a common pivot pin for said plate and clamping element, said clamping element being eccentrically mounted on said pivot pin, and having serrated belt engaging surfaces, said plate being provided with means to move said clamping element into and out of clamping position.

16. In a device of the character described, a belt buckle comprising a front and a pair of clamping elements for the ends of said belt pivotally mounted therein, said clamping elements having a common pivot pin, one of said clamping elements being eccentrically mounted therein, and the other of said clamping elements being provided with means to move said first clamping element into and out of clamping position.

17. In a device of the character described, a belt buckle comprising a front plate, side walls projecting rearwardly therefrom, a plate provided with gripping means for one end of a belt and a clamping element for the other end of said belt pivotally mounted between said side walls, and a common pivot pin for said plate and clamping element, said clamping element being eccentrically mounted on said pivot pin and having a lug thereon projecting toward said pivoted plate, whereby when said last mentioned plate is swung on its pivot toward said clamping element, said plate engages said lug to swing said clamping element into clamping relation to said belt.

18. In a device of the character described, a belt buckle comprising a front plate and a pair of clamping elements for the ends of said belt, said clamping elements being mounted for independent swinging movement on said front plate, one of said clamping elements being eccentrically mounted therein and the other of said clamping elements comprising a box like structure provided with belt end gripping means and overlying said eccentrically mounted clamping element.

19. In a device of the character described, a belt buckle comprising a front plate, side walls projecting rearwardly therefrom, a plate provided with gripping means for one end of a belt and a clamping element for the other end of said belt independently pivotally mounted between said side walls, said clamping element being eccentrically mounted on its pivot and having a portion thereon with which said pivoted plate is adapted to engage, whereby when said pivoted plate is swung on its pivot toward said clamping element said clamping element is swung into clamping relation with said belt.

20. In a device of the character described, a belt buckle comprising a front plate, side walls projecting rearwardly therefrom, a plate provided with gripping means for one end of a belt and a clamping element for the other end of said belt pivotally mounted between said side walls, said clamping element being eccentrically mounted on its pivot, and having a lug thereon projecting toward said pivoted plate, whereby when said last mentioned plate is swung on its pivot toward said clamping element said lug is engaged by said plate to swing said clamping element into clamping relation to said belt, said front plate and said pivoted plate having coöperating locking members thereon to lock said clamping element in clamping position.

21. In a device of the character described, a belt buckle comprising a front plate, side walls projecting rearwardly therefrom, a plate provided with gripping means for one end of a belt and a clamping element for the other end of said belt pivotally mounted between said side walls, said clamping element being eccentrically mounted on its pivot, and having a rearwardly extending lug thereon, whereby when said pivoted plate is swung on its pivot away from said clamping element the rear edge of said plate will engage said lug to swing said clamping element to belt releasing position.

22. In a device of the character described, a belt buckle comprising a front plate and a pair of clamping elements for the ends of said belt pivotally mounted therein, one of said clamping elements being eccentrically mounted therein, and the other of said elements being provided with means adapted to engage said first clamping element to move said first clamping element into and out of clamping position.

23. The combination with a belt of a belt buckle comprising a front plate, side walls projecting rearwardly therefrom, a plate provided with securing means for one end of said belt and a clamping element for the other end of said belt pivotally mounted for independent rotation between said side walls, said clamping element being positioned between said pivoted plate and said front plate, the major portion of said clamping element being located to one side of its pivot, said clamping element being provided with a portion with which said pivoted plate is adapted to engage, whereby when said pivoted plate is swung on its pivot toward said front plate, said clamping element is swung toward said front plate to clamp the other end of said plate between said clamping element and said front plate.

24. A belt buckle comprising a main body portion having a face plate portion, and a pair of side flanges between which one end of the belt is received, a pivot pin extending across from one flange to the other, a gripping member pivotally mounted on said pivot pin between which and said body portion one end of the belt is gripped, and a releasing member also pivotally mounted on said pivot pin for releasing said gripping member.

25. A belt buckle comprising a main body portion having a face plate portion, and a pair of side flanges between which one end of the belt is received, a pivot pin extending across from one flange to the other, a gripping member pivotally mounted on said pivot pin between which and said body portion one end of the belt is gripped, and a releasing member also pivotally mounted on said pivot pin for releasing said gripping member, and means for securing the other end of the belt to said pivoted releasing member.

26. A belt buckle comprising a main body portion having a face plate portion, and a pair of side flanges between which one end of the belt is received, a pivot pin extending across from one flange to the other, a gripping member pivotally mounted on said pivot pin between which and said body portion one end of the belt is gripped, and a releasing member also pivotally mounted on said pivot pin for releasing said gripping member, and means for securing the other end of the belt to said pivoted releasing member, comprising a dog pivoted on the swinging end of said releasing member.

27. A belt buckle comprising a body portion having a face plate portion and a pair of flanges between which one end of the belt is received, a pivot pin extending from one to the other of said flanges, a gripping member for gripping one end of the belt against the body portion, said gripping member having a pair of arms having a pivotal engagement with said pivot pin, a releasing member for releasing said gripping member, said releasing member having a pair of flanges between which the other end of the belt is received, said flanges having a pivotal engagement with said pivot pin.

28. A belt buckle comprising a body portion having a face plate portion and a pair of flanges between which one end of the belt is received, a pivot pin extending from one to the other of said flanges, a gripping member for gripping one end of the belt against the body portion, said gripping member having a pair of arms having a pivotal engagement with said pivot pin, a releasing member for releasing said gripping member, said releasing member having a pair of flanges between which the other end of the belt is received, said flanges having a pivotal engagement with said pivot pin, and a gripping jaw for gripping the belt pivotally mounted between the flanges of the releasing member.

29. A belt buckle comprising a main body portion having a face plate portion, and a pair of side flanges between which one end of the belt is received, a gripping member pivotally mounted between said side flanges between which and said body portion one end of the belt is gripped, and a releasing member pivotally mounted relative to said gripping member, said releasing member being provided with means engaging said gripping member for releasing said gripping member.

30. A belt buckle of the character described comprising a front plate and a belt end clamping element eccentrically pivotally mounted therein, a member having gripping means for the other end of said belt pivotally mounted relative to said clamping element and means on said member engaging said clamping element to move the same out of clamping relation with said belt.

In witness whereof, I hereunto subscribe my name this 17th day of June A. D., 1920.

SAMUEL BUCHSBAUM.